Patented Sept. 1, 1953

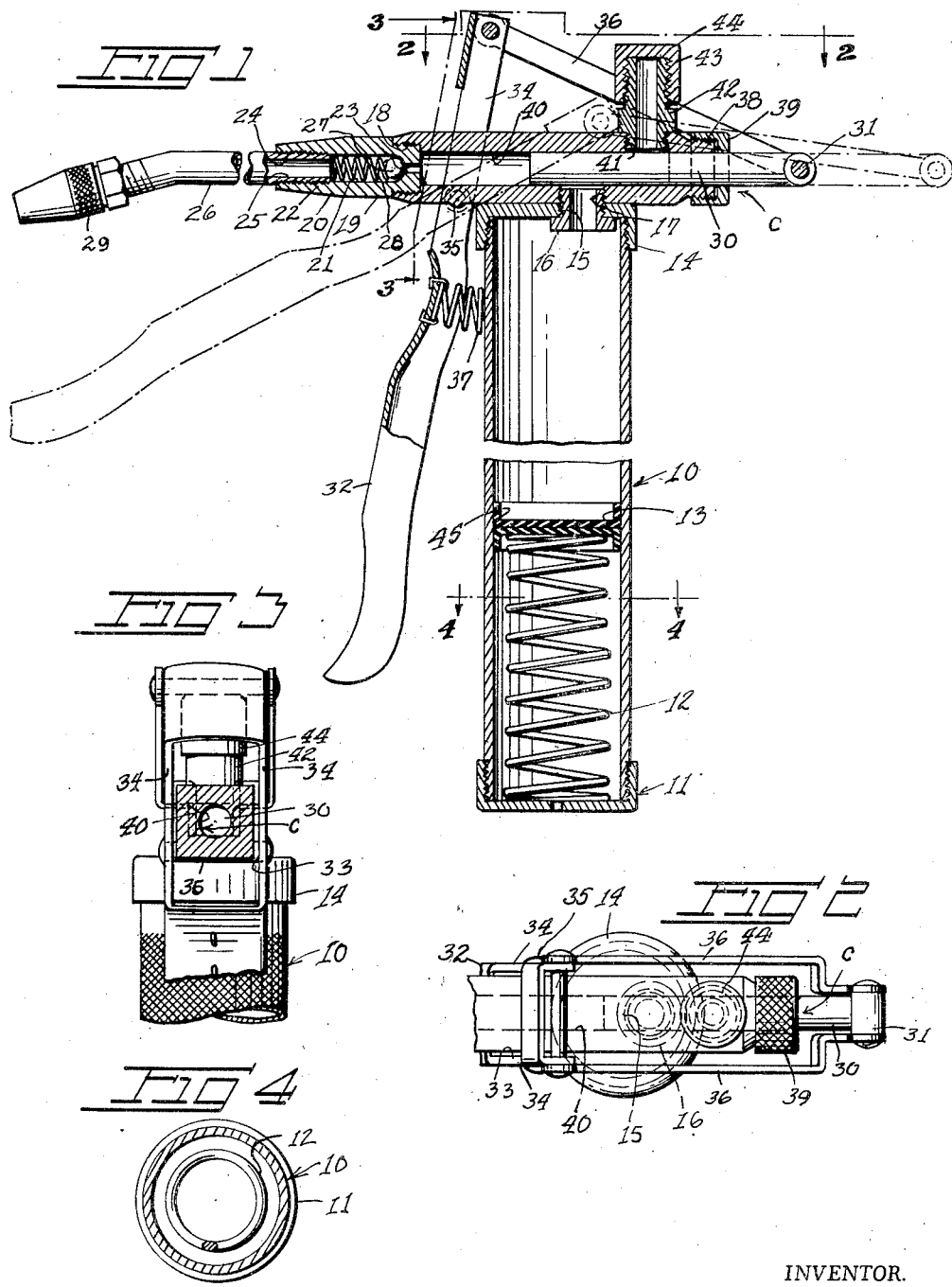

2,650,744

UNITED STATES PATENT OFFICE 2,650,744

GREASE GUN

Ole A. Dirksen, Spencer, Iowa

Application February 15, 1949, Serial No. 76,560

1 Claim. (Cl. 222—383)

The invention relates to grease guns adapted to be attached to and to be refilled from a grease pump.

The primary object of the invention is to provide a grease gun wherein the inlet or intake port or hole of which can be opened for filling with grease simply by opening wide the handle which moves the piston back past the filling port or hole allowing grease to enter and wherein the handle, after the gun is filled, is closed to normal or operating position, moving the piston forward to close the intake or filler port or hole.

It is also an object of the invention to provide a grease gun wherein the filling operation is of a character to allow no dirt or air to enter the gun, insuring clean grease and positive action while the gun is either being filled or used.

Furthermore, it is an object of the invention to provide a grease gun which can be operated by one hand thus enabling the operator to hold on with one hand while climbing a ladder, upon a machine and the like, and having his other hand free to use the pump and thus prevent accidents and making it safer in use than the type of pumps requiring both hands to operate.

Another object of the invention is to provide a grease gun of the character indicated above constructed small and compact so that grease fittings on machines of all kind can be reached without difficulty.

A further object of the invention is to provide a grease gun of the character indicated above equipped with a grease container and a grease expeller cylinder, in the latter of which a vacuum will be created, when the grease expelling piston is retracted, so that a plunger arranged in the grease container will be actuated to force grease from the container into the cylinder before the piston.

The invention consists in the details of construction and in the combination and arrangement of the several parts of my improved grease guns whereby certain advantages are attained, as will be hereinafter more fully set forth.

In order that my invention may be better understood, I will now proceed to describe the same with reference to the accompanying drawings wherein:

Figure 1 is a view partly in section and partly in elevation illustrating a grease gun combination in accordance with an embodiment of the invention;

Figure 2 is a fragmentary view in top plan as indicated by the arrows of line 2—2 of Figure 1;

Figure 3 is a fragmentary sectional view taken on the line 3—3 of Figure 1;

Figure 4 is a sectional view on the line 4—4 of Figure 1.

The grease gun as embodied herein comprises a tubular grease container 10, one end of which, hereinafter named the bottom end, is closed by means of a screw cap 11. A helical spring 12 is located in the grease container 10 and rests with one of its ends on the screw cap 11. A plunger 13 fits slidably in the container 10, and the helical spring 12 engages said plunger and urges it upwardly in the container.

A second screw cap 14 is arranged on the top end portion of the grease container 10 and is provided with a tapped porthole 15. An outwardly threaded nipple 16 is threaded into said porthole 15 and projects upwardly through the screw cap 14. A grease expeller cylinder C is provided intermediate its ends with a tapped hole 17 in its circumferential wall and is mounted on top of the grease container 10 by screwing the end portion of the nipple 16 projecting over the screw cap 14 into the tapped hole 17.

One end of the expeller cylinder C, hereinafter named the front end, is provided with an inside thread 18 adapted to receive the outwardly threaded rear end portion 19 of a valve body 20 preferably shaped like a nozzle. The rearward end portion 21 of the bore 22 of the valve body is reduced in diameter so that an inwardly projecting valve seat 23 is formed. The front end portion of the valve body bore 22 is provided with an inside thread 24 into which the threaded rear end portion 25 of an expeller tube 26 is screwed. A valve ball 27 fitting loosely in the bore 22 of the valve body 20 is urged against the valve seat 23 by a helical spring 28 engaging the valve ball with one of its ends and abutting with its other end into the rear edge of the expeller tube 26. A nozzle 29 is removably mounted on the front end portion of said expeller tube.

A piston 30 is slidably arranged in the expeller cylinder C and a pivot pin 31 extends diametrically through said piston and is located adjacent to the rear end thereof.

An actuating handle 32 has a bifurcated rear end portion and is pivotally mounted underneath the expeller cylinder C in front of the grease container 10, as at 33, so that the bifurcations 34 of the handle 32 straddle the cylinder C, and the rear end portions of said bifurcations project above said cylinder. A pivot pin 35 is supported by the bifurcations 39 adjacent to the rear ends thereof and extends above the cylinder C and toward both sides beyond the bifurcations.

A pair of connecting levers 36 are mounted pivotally on the pivot pin 31 in the piston 30 and on the pivot pin 35 in the handle bifurcations 34 so that the piston 30 is reciprocated in the cylinder C when the handle 32 is pivoted about the pivot pin 31. A helical spring 37 is secured by one of its ends to the side of the handle 32 facing the grease container 10, so that the hand of a person operating the grease gun is protected against coming into accidental forceful contact with the container.

The rear end portion of the expeller cylinder C is provided with an outside thread 38 and a screw cap 39 threadedly engages said thread. It is also provided with a centrally located axially extending opening 40 permitting reciprocating movement of the piston 30 extending through said hole.

The grease expeller cylinder C is provided with a tapped hole 41 in its circumferential wall rearwardly of the tapped hole 17, and an intake female nipple 42 is threadedly secured in said hole and extends radially upward from the cylinder for coaction with a filler fitting of a conventional grease pump (not shown). The nipple 42 is provided with an outside thread 43 to receive a screw cap 44 closing the bore of the intake nipple when not applied to a grease pump for the purpose of being filled.

The above described grease gun is operated as follows:

In order to fill the gun with grease the actuating handle 32 is pivoted away from the grease container 10, whereby the piston 30 is moved rearwardly in the grease expeller cylinder C so that the bore of the intake nipple 42 and the bore of the nipple 16 are uncovered. The screw cap 45 is removed from the intake nipple 42 and this nipple is connected with the filler fitting of a grease pump (not shown) from which grease is forced into the grease gun in any suitable conventional manner. The grease fills the expeller cylinder behind the valve ball 27, which is pressed against the valve seat 23 by the helical spring 28, and fills the container 10 above the plunger 13. The force urging the grease into the container urges the plunger 13 down in the container 10 compressing the helical spring 12. When the gun is fully loaded it is removed from the pump and the screw cap 45 is replaced on the intake nipple 42.

The nozzle 20 on the grease expeller tube 26 is placed in working position in relation to the grease fitting (not shown) to the filled and the actuating handle 32 is pivoted toward the grease container 10, whereby the piston 30 is moved forwardly in the cylinder C. During its forward movement the piston 30 covers and closes the bores of the intake nipple 42 and the nipple 16 and forces the grease in the cylinder against the valve ball 27, so that the same is removed from the valve seat 23. The grease enters the expeller tube 26 and is forced through the same and the nozzle 29 into the not shown grease fitting. The handle 22 is pivoted away from the container 10 pulling the piston 30 rearwardly in the cylinder C. Thereby the pressure against the valve ball 27 is removed so that the spring 28 will urge said ball into valve closing position. The rearward movement of the piston 30 creates a partial vacuum in the cylinder C and uncovers the bore of the nipple 16. The partial vacuum causes a suction above the container 10 so that the plunger 13 is moved upwardly in said container forcing grease into the cylinder C. The upward movement of the plunger 13 under the influence of the vacuum action is facilitated by the pressure of the spring 12. The plunger 13 is preferably formed like a disk provided with a circumferential flange 45.

From the foregoing description it is thought to be obvious that grease guns constructed in accordance with my invention are particularly well adapted for use by reason of the convenience and facility with which they may be assembled and operated.

I claim:

In a grease gun, a tubular container having removable end caps, a cylinder mounted crosswise of one of said caps, said cylinder and the said one cap having registering openings to establish communication between the cylinder and said container, a piston slidable inwardly of one end of said cylinder, a valved outlet at the opposite end of said cylinder, a hand lever having a bifurcated end portion straddled over the said opposite end of said cylinder, a pivot element for said lever passing through the lower side of said cylinder and the lever adjacent to the inner end of the furcation, a pivot element passing through the outer end of the furcation, links extending from opposite ends of the latter pivot element beyond the said one end of said cylinder, angular portions bent inwardly from the free ends of said links, and a pivot element carried by the outer end of said piston and connecting the angular portions of said links.

OLE A. DIRKSEN.

References Cited in the file of this patent

UNITED STATES PATENTS

| Number | Name | Date |
| --- | --- | --- |
| 1,721,817 | Goodman | July 23, 1929 |
| 1,943,605 | Hartman | Jan. 16, 1934 |
| 2,425,867 | Davis | Aug. 19, 1947 |
| 2,459,296 | Smith | Jan. 18, 1849 |
| 2,477,726 | Davis | Aug. 2, 1949 |
| 2,504,683 | Harnley | Apr. 18, 1950 |
| 2,510,972 | Gray | June 13, 1950 |